Aug. 9, 1960     J. L. WILLIAMS     2,948,503
WEDGE GATE VALVE
Filed May 14, 1956

INVENTOR.
JOHN L. WILLIAMS
BY
Buckhorn and Cheatham
ATTORNEYS

United States Patent Office 2,948,503
Patented Aug. 9, 1960

2,948,503

WEDGE GATE VALVE

John L. Williams, 2100 N. Albina Ave., Portland, Oreg.

Filed May 14, 1956, Ser. No. 584,560

6 Claims. (Cl. 251—85)

This invention relates to wedge gate valves, and particularly to a wedge gate valve of the type having a wedge gate including a pair of self-adjusting disks for engaging the valve seats of a valve.

Self-adjusting wedge gates of prior valves of the type under consideration have been complicated and expensive, and have required the use of special tools and considerable time for assembling and disassembling them.

It is a main object of the present invention to provide a wedge gate valve having a simple and inexpensive wedge gate including self-adjusting disks.

It is another object of the present invention to provide a valve having such a wedge gate in which the parts are so detachably connected together as to facilitate assemblage and disassemblage more readily than heretofore possible and without the use of special tools.

A further object of the present invention is to provide a wedge gate valve in which the gate is so connected to a power means and to a manual operable means that the valve may optionally be operated by either.

The valve of the present invention is characterized by including a gate including a gate carrier and a pair of disks supported by the carrier and connected to one another by a joint including a pivot and a socket which are detachably connected together. The valve is further characterized in having a handwheel for raising and lowering the gate, the handwheel being detachably connected to the piston rod of a pneumatic cylinder, which rod is connected to the gate, so that the gate optionally may be operated by either of the mechanisms.

Various other objects of the present invention will be apparent from the following description taken in connection with the accompanying drawings wherein.

Figure 1:
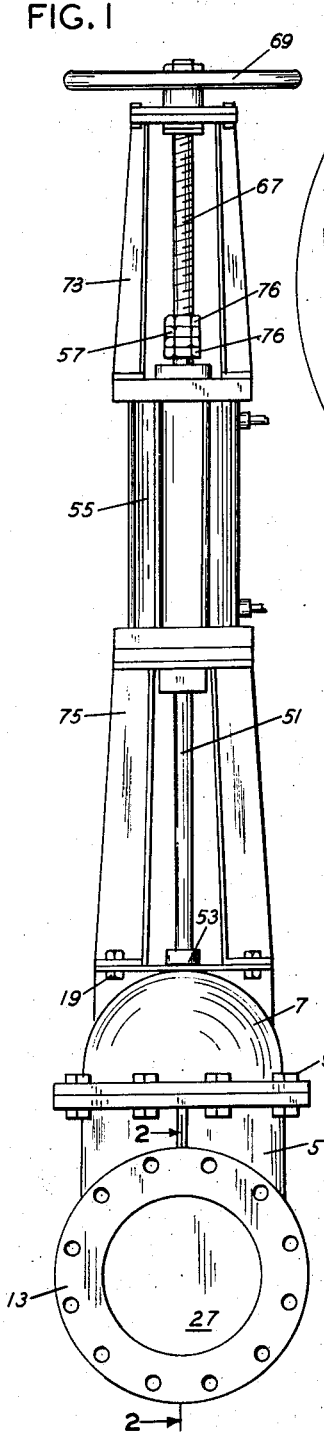
Fig. 1 is an end view of a valve embodying the concepts of the present invention.
Figure 2:
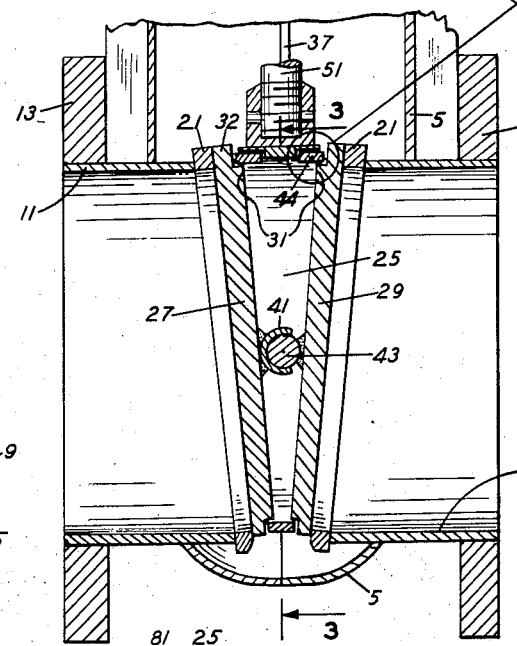
Fig. 2 is an enlarged fragmentary sectional view taken along line 2—2 of Fig. 1, showing the internal construction of the valve.

Referring to the Figs. 1 and 2, the valve disclosed has a body including a chest 5 having a bonnet 7 secured thereto by bolts 9. The body further includes tubular inlet and outlet members 11, Fig. 2, extending into the chest and being secured thereto and defining a flow passage extending through the valve. Suitable flanges 13 are fixed to the remote ends of the inlet and outlet members 11. Fixed within the valve body to the inner ends of the members 11 is a pair of spaced circular seats 21 which are angularly arranged relative to one another and surround the flow passage of the valve. As shown in Fig. 2, the seats diverge relative to one another in an upward direction, which is in the direction of opening movement of the gate of the valve, as the parts are shown.

Figure 3:
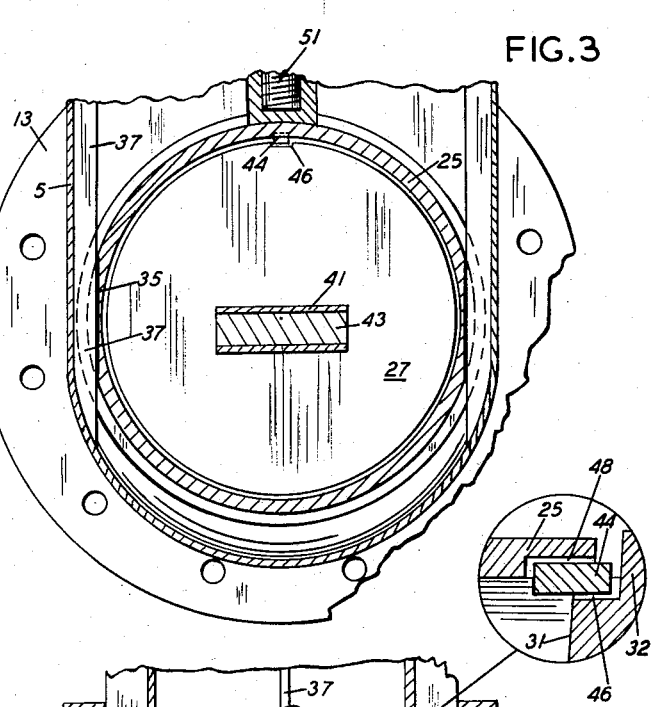
Fig. 3 is a fragmentary sectional view taken along line 3—3 of Fig. 2.

The gate is shown in closed position with respect to the seats, the gate including a downwardly tapering annular carrier 25, Figs. 2 and 3, and a pair of self-adjusting disks 27 and 29, each of which is recessed around the rim thereof to provide an annular shoulder 31 which loosely fits within the carrier 25 and rests at the lower portion thereof on the carrier whereby the disk is supported. The recessing also provides a flange 32 on each disk which abuts against or is disposed in contiguous relationship with respect to the edges of the carrier. The sides of the carrier have grooves 35, Fig. 3, and fitting within these grooves is a pair of guides 37 fixed to the sides of the chest 5. Thus the carrier is restrained to move in a linear path without rotary movement.

Disks 27 and 29 are connected together by a means which permits self-adjusting movement of the disks relative to one another and relative to the valve seats 21 so that the disks properly seat against the seats, and also cooperate with shoulders 31 and flanges 32 of the disks in supporting the disks on the carrier 25. The means provide for ready assembling and disassembling of the gate so that the disks 27 and 29 may readily be separated from the carrier or mounted on the carrier, as desired. These means are shown as including a socket member 41 secured to the disk 27 and a pivot member 43 secured to the disk 29, the socket member and pivot member pivotally and cooperatively engaging one another. The socket member is of generally tubular form and more specifically is of generally semi-cylindrical configuration, and the pivot member is shown of rod-like configuration. However, the socket member is not truly semicylindrical in that the walls thereof extend an arcuate amount greater than 180 degrees but less than 360 degrees, thus to retain the pivot against accidental dislodgment from the socket member. An arcuate amount of 220 degrees has proved satisfactory. An important feature of the invention is that the walls of the socket member are made thin enough so that they may yield an amount sufficient to enable the pivot member to be forced or snapped into or snapped out of the socket member thus permitting the disks readily to be mounted on or dismounted from the carrier. A wall thickness of 3/16" has proved satisfactory in valves ranging from 4" to 18".

It is apparent from Figs. 2 and 3 that the discs 27 and 29 might move in a circular orbit relative to the carrier 25 were it not for the provision of a pair of keys 44 which fit within appropriate slots 46 and 48 formed in the disks and in the carrier 25. Such movement would be undesirable in that the pivotal axis of the pivot and socket members would shift from a position normal to the direction of movement of the gate to a position oblique or even parallel to such direction. If this occurred, obviously the disks would not be able to adjust to fit properly against the valve seats 21.

The carrier 25 has a valve stem or rod 51 connected thereto, the valve stem extending through an appropriate packing box 53 and into a pneumatic cylinder 55 where it is connected to a piston, not shown. The rod or stem extends through the cylinder and projects out the upper end thereof. The upper end of the stem is connected by a detachable union 57 to the lower end of a handwheel stem 67, the upper end of which threadedly extends through a handwheel 69. The handwheel is journaled on a pair of yoke arms 73 which are mounted on their lower ends on the upper end of the cylinder 55. The lower end of the cylinder is mounted on a pair of yoke arms 75 which have the lower ends thereof mounted on the bonnet 7. The union 57 may conveniently be formed by welding a right-hand nut and a left-hand nut together and threading this nut unit on the adjacent ends of the rod 51 and the stem 67. Suitable jam nuts 76 are also provided.

Figure 4:
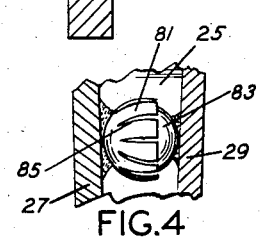
Fig. 4 is an enlarged fragmentary view showing a modified form of the invention.

Fig. 4 shows a modified form of the invention in which the socket member assumes the form of a hollow generally semispherical member 81 and the pivot member assumes the form of a ball 83 fitting within the cavity of the socket member. It is pointed out that the socket member is slit therearound at 85 to provide a number of curved fingers or segments which yieldingly engage the ball 83. The fingers extend beyond the center of the ball, that is, the walls of the socket member extend an arcuate amount greater than 180 degrees, so that the ball is firmly but releasably held by the fingers of the socket member. In this form of the invention, no keys 44 are required.

Having described the invention in what is considered to be the preferred embodiment thereof, it is desired that it be understood that the invention is not to be limited other than by the provisions of the following claims.

I claim:

1. A wedge type gate valve comprising a valve body having a through flow passage, a pair of opposed angularly related valve seats surrounding said passage, a wedge gate mounted for movement in a direction normal to said passage and to and from a position in seating engagement with said seats, said wedge gate including a pair of disks, means pivotally connecting said disks for pivotal movement of one relative to the other, said means including a socket member on one disk and a pivot member on the other disk movably and cooperatively received within said socket member, one of said members having yieldable portions engaging the other member so that said members are releasably held together against separating movement.

2. A wedge type gate valve comprising a valve body having a through flow passage, a pair of opposed angularly related valve seats surrounding said passage, a wedge gate mounted for movement in a direction normal to said passage and to and from a position in seating engagement with said seats, said wedge gate including a pair of disks, means pivotally connecting said disks for pivotal movement of one relative to the other, said means including a socket member on one disk and a pivot member on the other disk movably and cooperatively received within said socket member, said socket member having yieldable fingers engaging said pivot member and yieldingly holding said pivot member against separation from said socket member.

3. A wedge type gate valve comprising a valve body having a through flow passage, a pair of opposed angularly related valve seats surrounding said passage, a wedge gate mounted for movement in a direction normal to said passage and to and from a position in seating engagement with said seats, said wedge gate including a pair of disks, means pivotally connecting said disks for pivotal movement of one relative to the other, said means including a socket member on one disk and a pivot member on the other disk movably and cooperatively received within said socket member, said pivot member being in the form of a pivot pin or bar, said socket member providing an incomplete circular recess, said pin or bar extending at an angle to the direction of movement of said wedge gate, and means for preventing said pin or bar from rotating in a plane situated wholly between said pair of valve disks whereby to retain adjustability of the disks with respect to said valve seats.

4. A wedge type gate valve comprising a valve body having a through flow passage, a pair of opposed angularly related valve seats surrounding said passage, a wedge gate mounted for movement in a direction normal to said passage and to and from a position in seating engagement with said seats, said wedge gate including a pair of disks, means pivotally connecting said disks for pivotal movement of one relative to the other, said means including a socket member on one disk and a pivot member on the other disk movably and cooperatively received within said socket member, said socket member providing a curved recess defined by curved wall portions which extend an arcuate distance greater than 180 degrees but less than 360 degrees whereby to retain said pivot member against separation from said socket member, said curved wall portions being resilient to permit said pivot member to be withdrawn from said socket member by springing apart said curved wall portions.

5. A wedge type gate valve comprising a valve body having a through flow passage, a pair of opposed angularly related valve seats surrounding said passage, a wedge gate mounted for movement in a direction normal to said passage and to and from a position in seating engagement with said seats, said wedge gate including a pair of circular disks, means pivotally connecting said disks for pivotal movement of one relative to the other, said means including a socket member on one disk and a pivot member on the other disk movably and cooperatively received within said socket member, said gate including a carrier supporting said disks, said socket member being generally of tubular form and said pivot member being of rod form, and keying means preventing said disks from turning movement relative to said carrier.

6. A double disk type wedge gate valve comprising a valve body having a through flow passageway, a pair of angularly related seats surrounding said passage, said seats being disposed in spaced relation to one another, a wedge gate mounted for movement in a direction normal to said passageway and to and from a position against said seats, said gate including an annular carrier, a pair of disks disposed one on either side of said carrier, and means separate from the valve seats connecting said disks together to retain said disks against separation from said carrier but providing for pivotal movement of said disks relative to said carrier, said means also providing for separation of said disks upon predetermined manipulation of said disks in a manner other than the pivotal movement of said disks.

References Cited in the file of this patent

UNITED STATES PATENTS

| | | |
|---|---|---|
| 284,122 | Dover | Aug. 28, 1883 |
| 516,200 | Graebert | Mar. 13, 1894 |
| 786,043 | Luckett | Mar. 28, 1905 |
| 1,019,447 | Foerst | Mar. 5, 1912 |
| 1,545,696 | Riley | July 14, 1925 |
| 2,404,349 | Brant et al. | July 23, 1946 |
| 2,707,483 | Shafer | May 3, 1955 |
| 2,733,041 | Crookston | Jan. 31, 1956 |

FOREIGN PATENTS

| | | |
|---|---|---|
| 20,921 | Great Britain | Apr. 27, 1911 |
| 707,558 | Great Britain | Apr. 21, 1954 |